(45.)

J. R. TUNNICLIFF.

No. 4,554 Impd Fire Alarm. Reissued Sep. 12, 1871.

Witnesses.

Harry King
Phil. T. Dodge

Inventor.

G. O. Fowler Jr
assignee & applicant
by Dodge & Munn
his attys.

AM. PHOTO-LITHOGRAPHIC CO. N.Y. (OSBORNE'S PROCESS.)

UNITED STATES PATENT OFFICE.

JONATHAN O. FOWLER, JR., OF HUDSON, WISCONSIN, ASSIGNEE OF J. R. TUNNICLIFFE, DECEASED.

IMPROVEMENT IN FIRE-ALARMS.

Specification forming part of Letters Patent No. 35,050, dated April 22, 1862; reissue No. 4,554, dated September 12, 1871.

*To all whom it may concern:*

Be it known that J. R. TUNNICLIFFE, deceased, of Van Hornesville, in the county of Herkimer and State of New York, invented certain new and useful Improvements in Fire-Alarms; and I do hereby declare that the following is a full, clear, and exact description thereof, reference being had to the accompanying drawing making part of this specification, and to the letters of reference marked thereon, like letters indicating like parts wherever they occur.

To enable others skilled in the art to construct and use the invention, I will proceed to describe it.

This invention consists of a barrel made portable and detachable and charged with gunpowder or other explosive material, and provided with a fuse having its end dipped into or saturated with some explosive material that will ignite at a certain fixed temperature and fire the charge for the purpose of giving an alarm.

Figure 1:
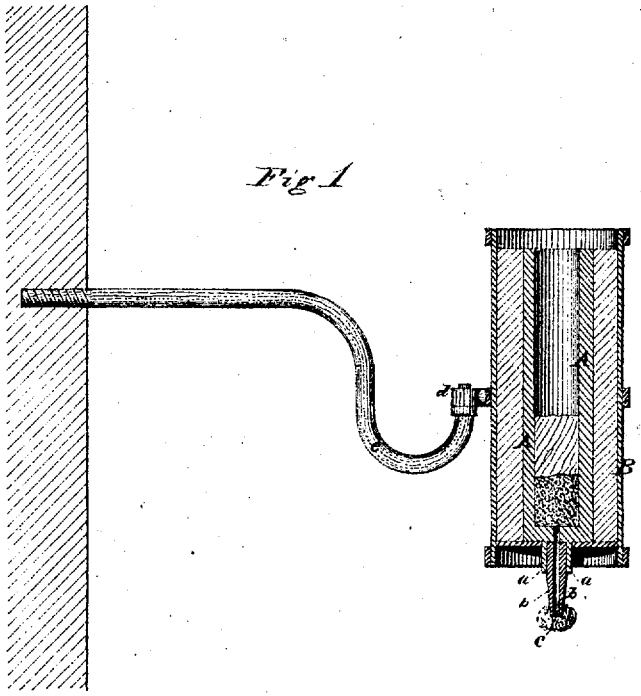
Figure 2:
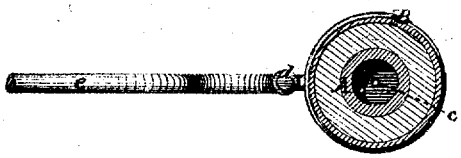

In the drawing, Figure 1 is a longitudinal vertical section of the device, and Fig. 2 a cross-section of the same.

The device or apparatus is constructed of a barrel or tube, A, provided at its lower end with a smaller tube or socket, *a*, and is surrounded, for the sake of convenience, with a case, B, of brass or other suitable material. Into the small tube or socket *a* is inserted a match or fuse, *b*, having a groove or channel, *c*, running through its entire length and opening into the bottom of the tube or barrel A, as shown in Fig. 1. The outer end of this fuse or match *b* is dipped, saturated, or otherwise provided with some composition that will ignite at a certain fixed temperature. The match or fuse *b*, for the purpose of more certainly and promptly conveying its fire when ignited to the chamber of the barrel A, has its groove or channel *c* filled with any substance suitable for that purpose, and the barrel A is charged with gunpowder, as shown in the same figure. The case B is provided with a socket, *d*, for connecting it to a hook, *l*, or any other device that may be suitable for attachment to the wall of a room or to any portion of the house that may be desired.

An apparatus thus made should, of course, be placed where it cannot be accessible to children, and where it will not be exposed to accident or be liable to be meddled with for any cause. If desired, it may be protected by a wire casing, especially the match or fuse. When located within a building it will be seen that, on the occurrence of a fire heating the air in its vicinity above the temperature at which the fuse ignites, it will at once take fire and cause an explosion of the gunpowder within its barrel, and thus give the desired fire-alarm to the inmates of the building, as well as to all persons in the neighborhood.

Having thus described the invention, no claim is made to the material of which the fuse is made or compounded, nor to its shape, or to the size, shape, or position of the barrel or chamber containing the explosive material; but

What is claimed, and for which Letters Patent are desired, is—

A fire-alarm, consisting of a detachable and portable barrel loaded with powder, and provided with a fuse having its outer end saturated with a composition ignitable by hot air at a fixed temperature, substantially as herein described.

J. O. FOWLER, JR., *Assignee.*

Witnesses:
N. H. CLAPP,
HENRY A. WILSON.